US005668959A

United States Patent [19]
Malcolm

[11] Patent Number: 5,668,959
[45] Date of Patent: Sep. 16, 1997

[54] CREATING MULTIPLE VERSIONS OF PANELS FROM A SINGLE PANEL DEFINITION FILE

[75] Inventor: Jerry Walter Malcolm, Austin, Tex.

[73] Assignee: International Business Machines Corporation, Armonk, N.Y.

[21] Appl. No.: 483,903

[22] Filed: Jun. 7, 1995

Related U.S. Application Data

[63] Continuation of Ser. No. 253,193, Jun. 2, 1994, abandoned, which is a continuation of Ser. No. 747,169, Aug. 19, 1991, abandoned.

[51] Int. Cl.$^6$ ........................................ G06F 3/14
[52] U.S. Cl. .......................... 345/333; 345/334
[58] Field of Search .................... 395/157, 155, 395/148, 153, 161, 326, 333, 334, 343, 344, 340

[56] References Cited

U.S. PATENT DOCUMENTS

| | | | |
|---|---|---|---|
| 5,001,654 | 3/1991 | Winiger et al. | 395/161 X |
| 5,119,476 | 6/1992 | Texier | 395/157 |
| 5,179,657 | 1/1993 | Dykstal et al. | 395/155 X |
| 5,179,700 | 1/1993 | Aihara et al. | 395/157 X |
| 5,220,675 | 6/1993 | Padawer et al. | 395/155 X |
| 5,228,123 | 7/1993 | Heckel | 395/155 |
| 5,297,250 | 3/1994 | Leroy et al. | 395/157 |
| 5,305,434 | 4/1994 | Ballard et al. | 395/155 |
| 5,321,803 | 6/1994 | Ditter, Jr. | 395/155 X |
| 5,325,478 | 6/1994 | Shelton et al. | 395/155 X |
| 5,353,401 | 10/1994 | Iizawa et al. | 395/155 X |

OTHER PUBLICATIONS

Microsoft Windows User's Guide (Trademark of Microsoft Corporation 1990) pp. 115, 145–193.

IBM Technical Disclosure Bulletin, vol. 30, No. 10, Mar. 1988, p. 215, "User–Oriented In–Line Panel Definition".

IBM Technical Disclosure Bulletin, vol. 28, No. 1, Jun. 1985, p. 117, "PC Composite Screen Display".

IBM Technical Disclosure Bulletin, vol. 32, No. 6B, Nov. 1989, p. 77, "Panel Element Conditioning With Truth Tables".

IBM Technical Disclosure Bulletin, vol. 32, No. 8B, Jan. 1990, p. 257, "Variable Windowing Implementation".

IBM Technical Disclosure Bulletin, vol. 31, No. 8, Jan. 1989, p. 236, "Default Panel Concept".

IBM Technical Disclosure Bulletin, vol. 31, No. 6, Nov. 1988, p. 333, "Selecting All to Populate Field Names in Pop–Up Panels".

Research Disclosure, Nov. 1989, No. 307, "Improved Panel Customization Features".

Primary Examiner—Mark K. Zimmerman
Assistant Examiner—Cliff N. Vo
Attorney, Agent, or Firm—Jeffrey S. Labaw; Andrea P. Bryant

[57] ABSTRACT

A computer system for providing application program developers a technique for building a plurality of panel displays from a single, comprehensive panel definition source file. The system includes routines for creating panel definition information, acquiring a copy of previously created panel information and displaying panels dynamically created at run time using previously stored panel definition information. The system also allows the specification of modifications to panel displays at run time as well as an option for look ahead processing of previously defined and newly specified panels at run time.

16 Claims, 7 Drawing Sheets

V1 Customer Data

Name

Address

Zip

Account type
- ◯ Savings
- ◯ Checking

FIG. 2

V2 Customer Data

Name

New Address

Zip

☐ New customer

FIG. 3

V3 Customer Data

Name

Address

Zip

☐ New customer

7
CREATING MULTIPLE VERSIONS OF PANELS FROM A SINGLE PANEL DEFINITION FILE

This application is a continuation of Ser. No. 08/253,193 filed on Jun. 2, 1994, now abandoned, which is a continuation of Ser. No. 07/747,169 filed on Aug. 19, 1991, now abandoned.

CROSS REFERENCE TO RELATED PATENT APPLICATIONS

The subject matter of the present invention is related to commonly assigned copending concurrently filed applications:

Copending application entitled "Computer System for Dynamically Generating Display Screen Panels Providing Interactive Interfaces for Application Program Steps", Ser. No. 07/747,167 filed Aug. 19, 1991 now U.S. Pat. No. 5,533,184;

Copending application entitled "A System and Method for Supporting Multilingual Translations of a Windowed User Interface", Ser. No. 07/747,168 filed Aug. 19, 1992 now U.S. Pat. No. 5,416,903;

Copending application entitled "Automatic Program Documentation", Ser. No. 07/747,170 filed Aug. 19, 1991, now abandoned.

BACKGROUND OF THE INVENTION

1. Field of the Invention

This invention relates to the definition and generation of interactive computer display panels by application programs. More specifically, it relates to the definition and generation of a plurality of interactive display panels from a single panel definition source file.

2. Background Art

The application program orchestrates the PC or workstation computer to perform the combination of functions or jobs which the user needs it to perform. The interactive display screen has traditionally been the means through which the user provides his input to the application program and the application program provides its output to the user. Originally, this interface was a relatively complex one requiring a user who was computer literate. He had to be familiar with the exact instructions needed to input or extract data from the application program. However, with the proliferation of PC and workstation users who were not very computer literate, the trend has been to make the interface as user friendly as possible. Screen panels explaining simply every I/O step relative to the application program and help screen with further information were available at the touch of a key, and icons were included to increase the user's familiarity and recollection.

It followed, however, that as the interfaces became more and more friendly and simplified, the design of the sets of screen panels required for such user friendly interfaces became more and more time consuming, complex and tedious. For example, an I/O exchange with an application program which if designed for a computer literate user might consume one or two panels, could require 10 or 15 panels with layouts which are relatively complex to design when used for a user friendly interface with a user who knew little about computer languages.

It was not unusual for designers of user friendly interfaces with application programs to have to design several hundred or more screen panels in order to provide a user friendly interface with that application program. This presented a lengthy and tedious task for the display screen panel designer. He usually had to design each panel individually, almost exactly laying out each of the components in the panel along selected X,Y coordinates. This further required a fair amount of layout skills on the part of the designer in order to provide some consistency in layouts from panel to panel.

Thus, it can be seen that the creation of a set of panels used to implement the I/O interface with an application program required a considerable expenditure of resources. It often required a lengthy and tedious effort by an individual who had both considerable computer skills as well as layout and graphical skills.

Various attempts have been made in the prior art to address useability issues arising in panel definition and generation by application programs. The following are illustrative of conventional techniques. *IBM Technical Disclosure Bulletin*, Vol. 30, No. 10, March 1988, p. 215, "USER-ORIENTED IN-LINE PANEL DEFINITION". *IBM Technical Disclosure Bulletin*, Vol. 28, No. 1, June 1985, p. 117, "PC COMPOSITE SCREEN DISPLAY". *IBM Technical Disclosure Bulletin, Vol. 32*, No. 6B, November 1989, p. 77, "PANEL ELEMENT CONDITIONING WITH TRUTH TABLES". *IBM Technical Disclosure Bulletin*, Vol. 32, No. 8B, January 1990, p. 257, "VARIABLE WINDOWING IMPLEMENTATION". *IBM Technical Disclosure Bulletin*, Vol. 31, No. 8, January 1989, p. 236, "DEFAULT PANEL CONCEPT". *IBM Technical Disclosure Bulletin*, Vol. 31, No. 6, November 1988, p. 333, "SELECTING ALL TO POPULATE FIELD NAMES IN POP-UP PANELS".

In the prior art, when different panels were required, no matter how similar some might be, separate panel source files were required. This results in requirements for multiple updates if a common element on several panels change. It also results in increased translation costs for products that must be translated into other languages since common elements must be retranslated for each panel. Also, additional storage is required in many cases since more panel images will appear on the storage media.

The prior art has addressed this storage problem in a nonstructured way by making certain panel elements invisible and others visible. This results in requirements to make the panel size and layout fit worst-case conditions which has not been acceptable to the user in many situations.

By creating the layout and size based on the panel variations, the amount of time and perceived user delay becomes a potential problem. To date, complex panel layouts wherein the time to calculate the layout and become a serious factor have not been attempted.

SUMMARY OF THE INVENTION

The present invention overcomes the aforementioned problems in the prior art and provides additional function to an application program developer by enabling the generation of a plurality of interactive display panels from information provided by a panel designer and/or the application developer in a single panel definition source file. Such an arrangement decreases the amount of storage space required by the system since duplicate entries are substantially eliminated from the panel definition source files.

Panel layout parameters for a plurality of related panels are input to the system of the present invention in a single source file at build time. At the time of entry, each panel layout parameter is identified as to which of the plurality of related interactive panels it pertains. The single source file is compiled, and separate panel build instructions are generated for each of the plurality of related panels. These panel build instructions are stored for subsequent access by the application program during run time when panel displays in accordance with the panel build instructions are dynamically prepared. The present invention further provides the application program developer the ability to specify at run time still other version(s) of the panels previously structured at build time.

Instruction means are provided in the system of the present invention for enabling an application program developer to cause at run time the display of a previously structured panel as well as the display of a modification to a previously structured panel, thereby in effect designing a new panel. In this aspect of the present invention, the application program developer may do a look-ahead panel creation of panels having a high possibility of being accessed from a panel currently in use. That is, the application developer, recognizing the possible paths which may be chosen by a user of any one panel, can have prepared in advance those panels associated with those possible paths so that the user experiences a perceived zero creation time.

BRIEF DESCRIPTION OF THE DRAWING

The above and other features and advantages of the present invention will be described in greater detail having reference to the drawing wherein like reference numerals are used throughout to indicate the same elements and wherein.

DESCRIPTION OF A PREFERRED EMBODIMENT

Figure 1:
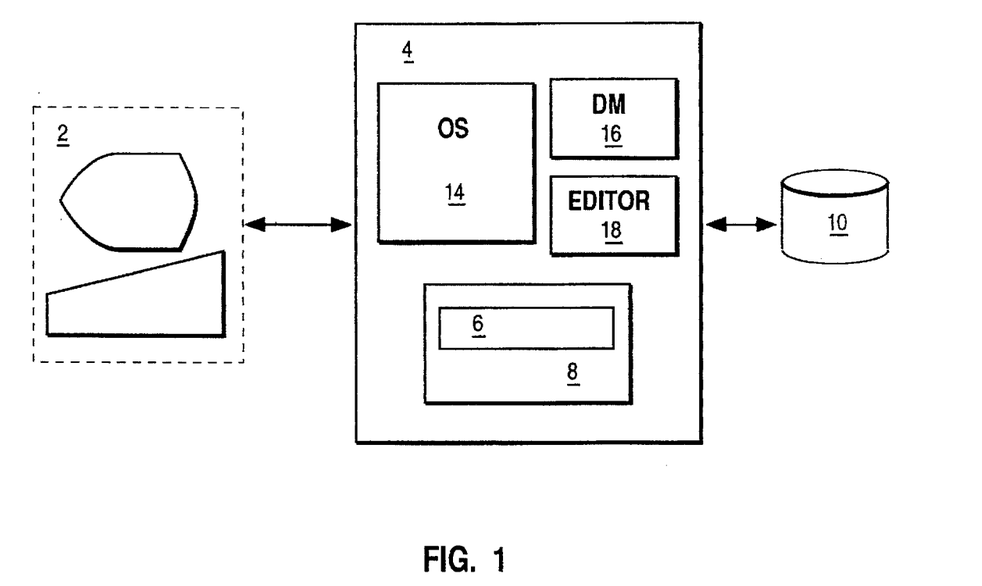
FIG. 1 is a schematic block diagram of a system in which the present invention is embodied.

Refer now to FIG. 1 which shows schematically a system in which the present invention may be embodied. The present invention includes two major components, a build time component and a run time component. In FIG. 1 an I/O terminal 2 is shown for interfacing with processor 4 for executing program 6, resident in system memory 8, for creating multiple panels. Auxiliary storage 10 is provided for containing various outputs, intermediary and final, from program 6. Processor 4 is shown to include an operating system 14, a display manager 16 and a text editor 18. For the preferred embodiment of the present invention, processor 4 may be an IBM Personal System/2, Model 70 having an IBM OS/2 Operating System running Presentation Manager for display management. Terminal 2 is a computer keyboard and display monitor.

Figure 2:
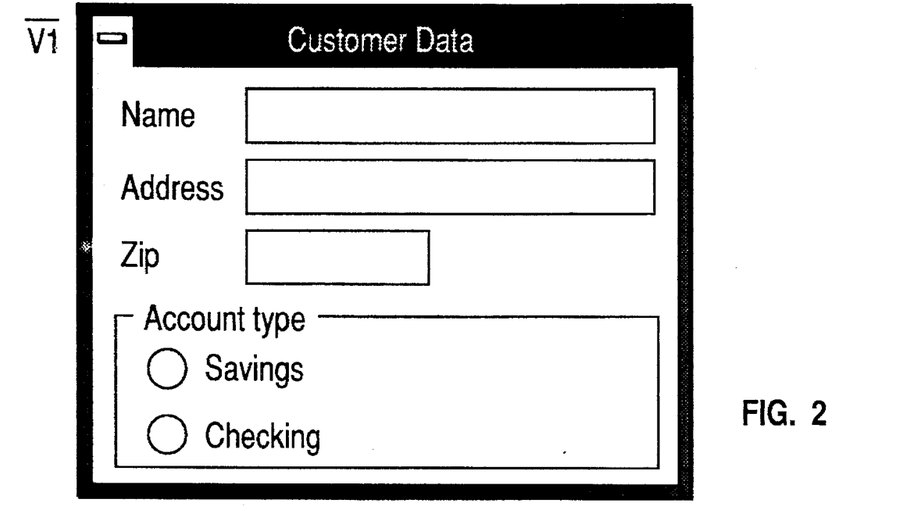
FIG. 2 is a diagram of a typical display screen panel layout which may be formed using the system of the present invention.
Figure 3:
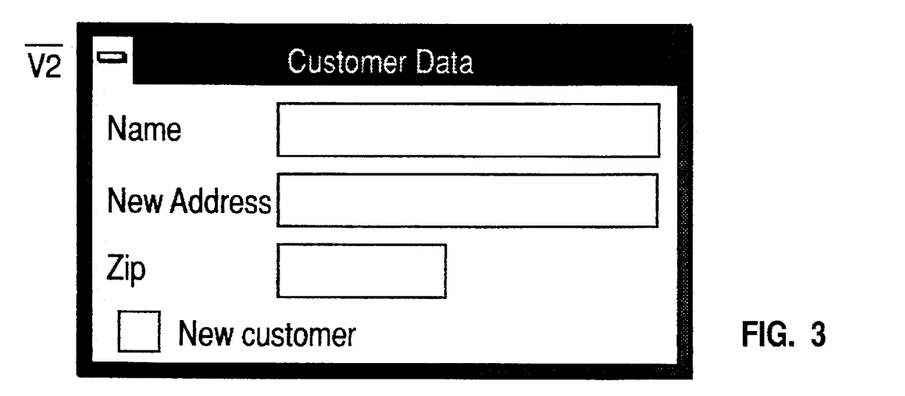
FIG. 3 is a diagram of another typical display screen panel layout which may be formed using the system of the present invention.
Figure 4:
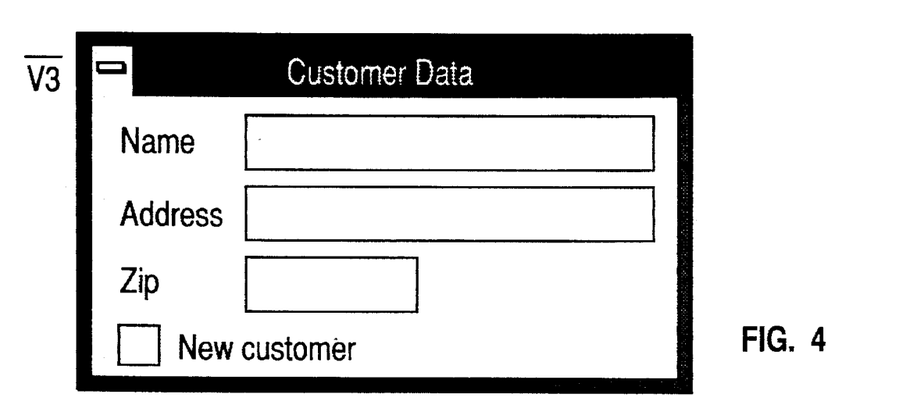
FIG. 4 is a diagram of still another display screen panel layout which may be formed using the system of the present invention.

Referring now to FIGS. 2–4, one can appreciate the similarity among three illustrative panel versions (v1, v2, and v3) shown. All three contain common elements "Name" and "Zip". FIGS. 2 and 4 also have "Address" as a common element while FIGS. 3 and 4 have also the "New Customer" element in common. Only FIG. 2 has the account type element along with different text for the Address prompt. Maintaining for each of the panels of FIGS. 2–4 all the information needed to display them would require much duplication in storage. With my invention however, common elements are stored only once.

The following pseudo code illustrates logic implementing this aspect of my invention.

Panel Definition Single Source File Pseudocode:

```
begin panel definition with title text of 'Customer Data'
| create an entry field of width 20 with prompt text: |
  'Name'
| create an entry field of width 20 with prompt text: |
  'Address' on version 2, the prompt text should be | 'New
  Address'
| create an entry field of width 7 with prompt text: | 'Zip'
| create a checkbox with prompt text: 'New customer'
|      Only create this checkbox on versions 2 & 3.
| begin a group box with text: 'Account type'
| | Only create this group box and contents on
| |       version 1
| | create a radio button with text: 'Savings'
| | create a radio button with text: 'Checking'
| end the group box
end panel definitions
```

Note that panel v1, FIG. 2, includes radio buttons nested within the group box definition so that the radio buttons are used or omitted as the group is. Panel v2, FIG. 3, has a new customer checkbox, and the prompt text for the second element is changed to "New Address". Panel v3, FIG. 4, includes the checkbox, but default, first defined, prompt text will be used for the second entry field.

Figure 5:
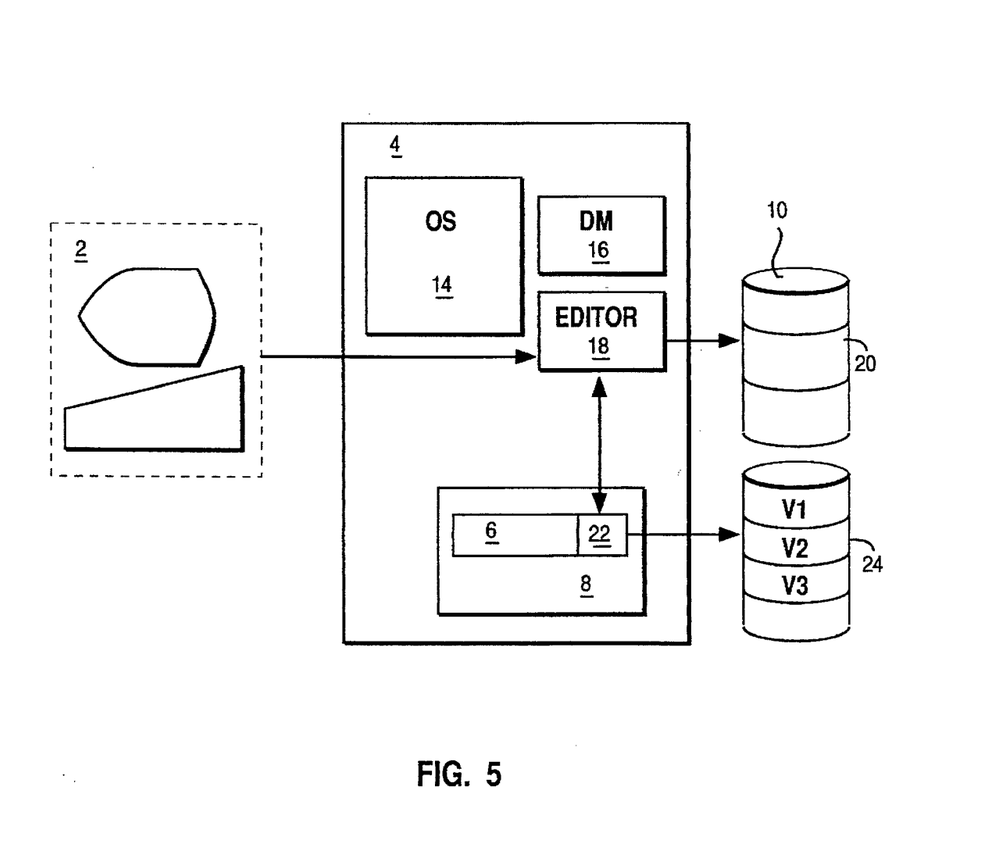
FIG. 5 illustrates data flow during build time.

FIG. 5 represents data flow during the build time component of the present invention. A panel designer through terminal 2 inputs source statements to editor 18 for defining desired panel content. Panel design content for related panels is described at the same time using any structured, keyword based panel definition language. Editor 18 processes user input defining the three panel versions of FIGS. 2–4 and makes a single file of source data 20, which may be placed on auxiliary storage 10.

Compiler 22 reads source file 20 and generates three separate object files v1, v2, v3 and stores them in panel build instruction memory 24 for subsequent use at run time. It will be appreciated that the panel definition step and object file generation step may be performed at different times, by different operators. There follows a pseudo code description of the build time versioning aspect of my invention. In the pseudocode, instruction means complete line or block of source code while keyword means a subinstruction (e.g., 'text=').

Buildtime-Versioning Pseudocode:

```
Do for all versions
| Do for every instruction:
| |
| | if instruction applies to all versions (no
| | | 'VERSION=' keyword) OR if instruction
```

-continued

```
I I I applies to current version (current version
I I I appears on 'VERSION='keyword) then do
I I I Add instruction to compile list
I I I do for each keyword:
I I I I if keyword applies to all versions (no
I I I I I version specified on keyword) OR
I I I I I if keyword applies to current version
I I I I I (e.g., 'TEXT(2)=' applies to version 2 I I I I
I only) then do
I I I I I Add keyword to compile list
I I I I end
I I I I else do /* keyword not for this version */
I I I I I discard keyword
I I I I end
I I I end
I I end
I I else do /* instruction does not apply to this
I I version */
I I I discard entire instruction
I I I if instruction contains nested instructions
I I    I then do
I I I I discard all nested instructions as well
I I I end
I I end
I end
I Create Panel Build Instructions (OBJ) from compile
I list
End
```

Figure 6:
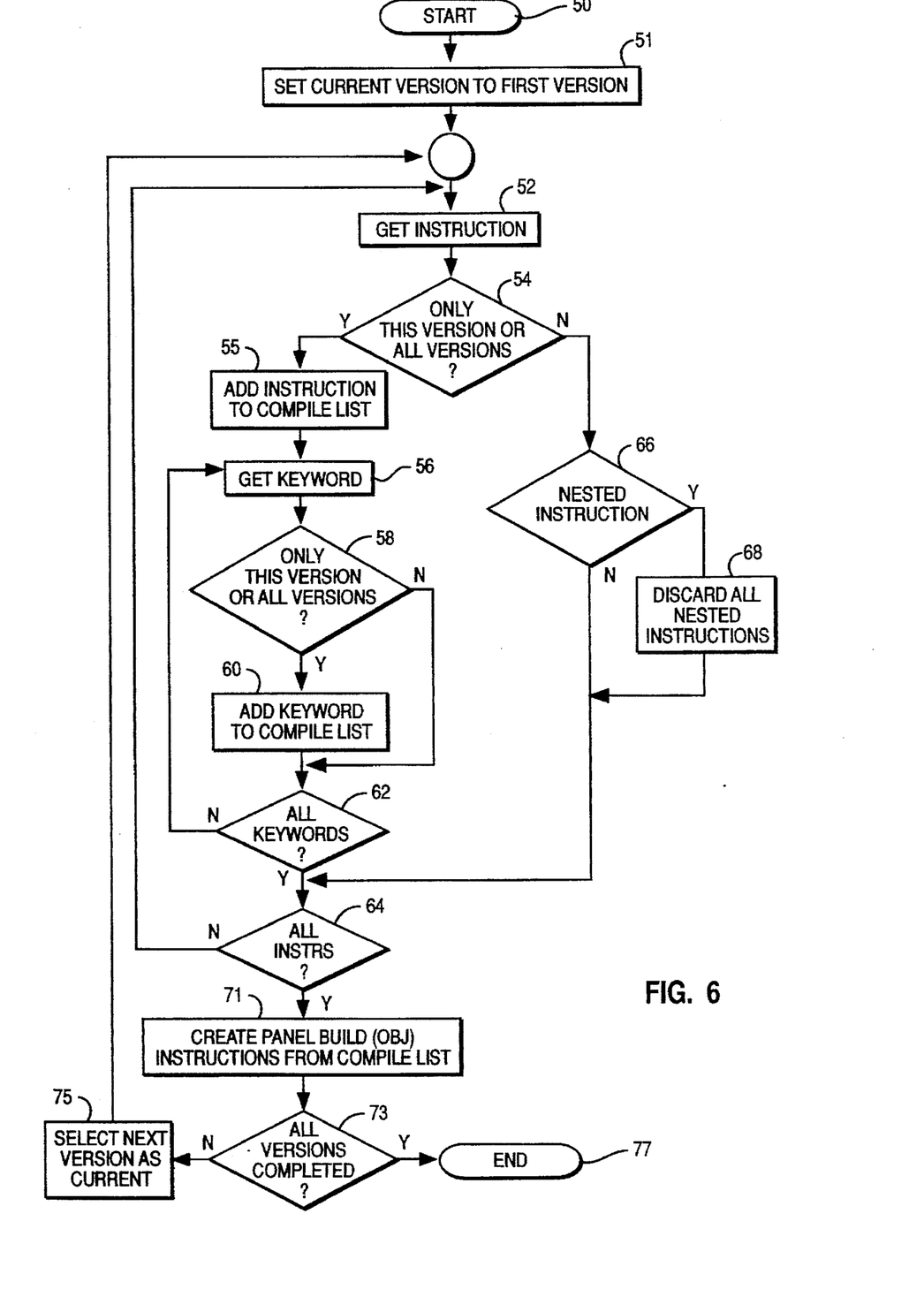
FIG. 6 is a flow chart of logic used in the present invention for build time versioning.

FIG. 6 illustrates logic suitable for implementing this build time versioning aspect of the present invention at which build instructions for plural panel versions are are compiled from the single source file 20 and stored in object format. The logic commences at terminal 50 for each panel version defined in source file 20. At step 51 the logic sets first version to be 'current version'. At step 52 compiler 22 retrieves an instruction from single source file 20. At step 54 a determination is made as to which panel versions the instruction applies. If the instruction applies to either the current version or to all versions, it is added to on the compile list at step 55. Then at step 56 a keyword is retrieved and the logic determines whether the keyword is used only in the instant version or in all versions. If so, then the keyword is added to the compile list at block 60. Otherwise the logic branches to decision block 62 to decide whether it has handled all keywords. If not, control returns to step 56. If all keywords have been handled, the logic determines whether it has treated all instructions at step 64. If there are more instructions, control passes back to step 52 to retrieve from source file 20 another instruction.

If at step 54 it was determined that the instruction being examined does not apply to the version being compiled, the logic branches to decision block 66 to see if a nested instruction is present. If so, then at block 68 all nested instructions are discarded. This feature of my invention further simplifies the task of panel design and modification. From either step 66 or 68 the logic then proceeds to step 64. When all instructions for a given panel version have been processed, the compile list is processed into Panel Build Instructions (20, FIG. 2). Then the process repeats for the next version at steps 73 and 75 until all versions are completed. When processing for all versions is complete, the logic concludes at terminal 77.

Panel build instructions in object format are processed at run time for display as more particularly described in my above referenced copending application Ser. No. 07/747, 167, herewith incorporated by reference.

Figure 7:
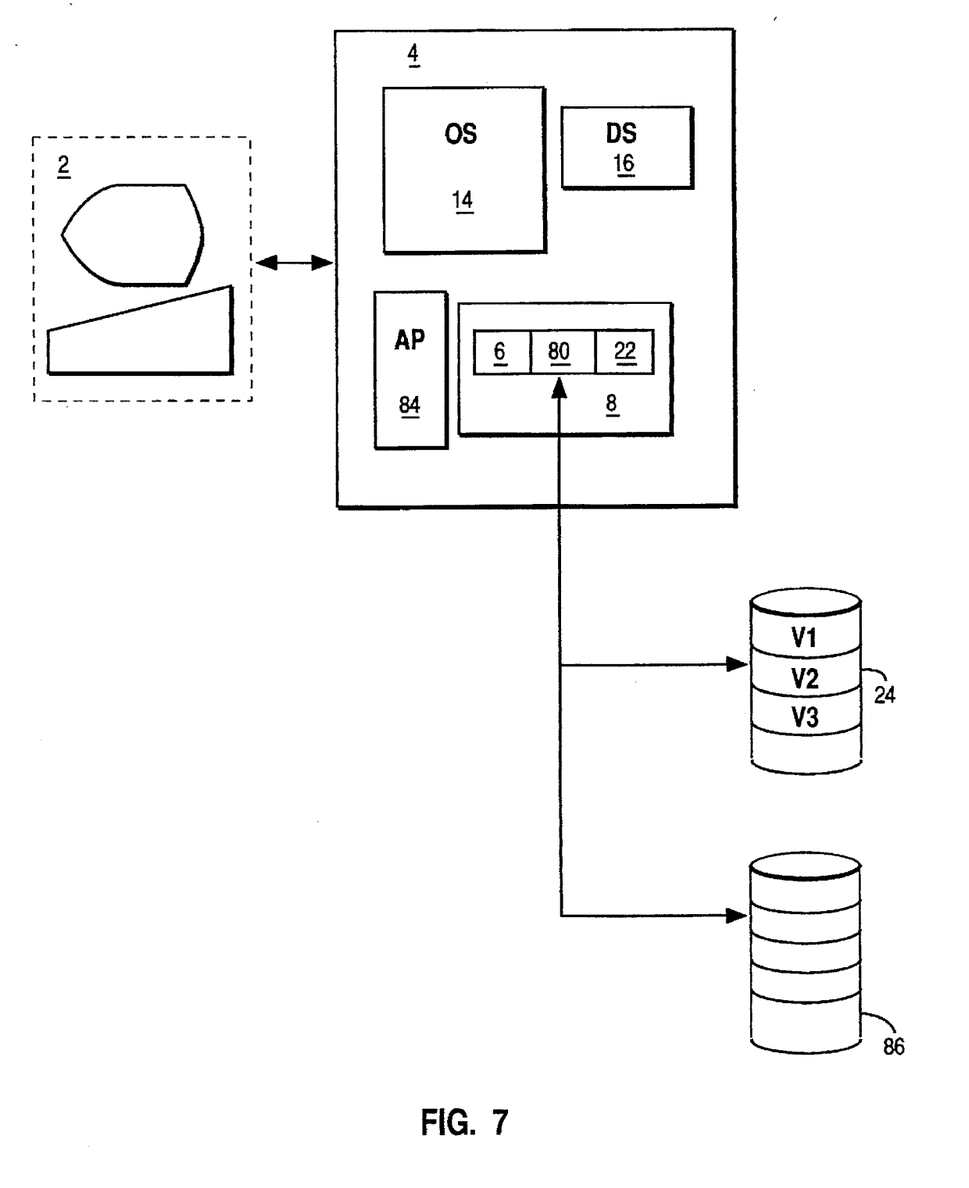
FIG. 7 illustrates data flow during run time.

Refer now to FIG. 7 for an understanding of data flow at run time. Those elements of the system show which are the same as those in FIGS. 1 and 5 will not be discussed further. The run time component 80 of the present invention enables a user at terminal 2 to interact with application program 84. In response to commands from application program 84 run time component 80 provides interactive display panels on the screen of terminal 2. Panels are dynamically generated at run time, as taught in my just above cited copending application, using the previously stored panel build instructions stored in panel build instruction memory 24 to construct platform specific panel display commands which are then stored on library 86 which is associated with application program 84.

My invention also permits application programs to use run time versioning, a technique which permits modifying an existing panel at run time before display thereof. The number of modified panels or run time versions is practically unlimited.

Figure 8:
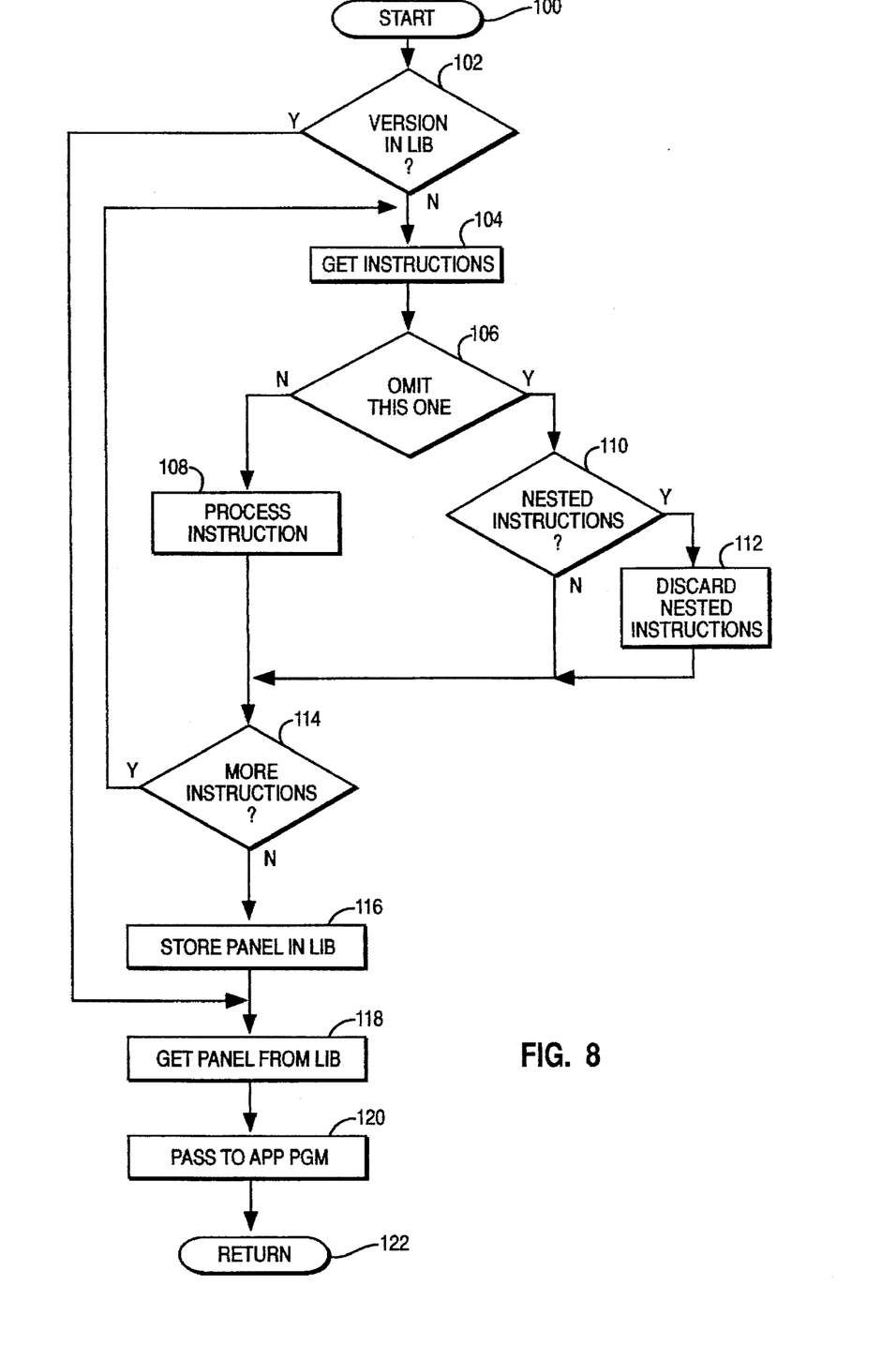
FIG. 8 is a flow chart for run time panel versioning.

FIG. 8 is a flow chart of the logic followed by the run time component (80, FIG. 7) for performing run time panel versioning. For purposes of explanation, let us assume the application program in execution has requested for display a panel "A" which is to be the same as previously defined panel v1, FIG. 2, with a slight modification. The Name field identifier is to be removed. The modified version is to be called Panel A_v1.

The logic shown in FIG. 8 commences at terminal 100 responsive to receiving the just described request from the application program 84, FIG. 7. At decision block 102 the logic determines if the specified panel version already exists on the library 86 associated with the application program 84. If the requested version is not found on the library then run time component logic retrieves instructions needed to create a library entry from Panel Build Instruction Memory 24 at step 104. Next, a determination is made at block 106 whether the instant instruction is to be omitted from the modified panel. If the instruction is to be included, then it is processed according to the teaching of my copending application Ser. No. 07/747,167. Information from this instruction then becomes part of current entry in library 86 at step 108. This step is where the platform specific panel display commands which actually effect panel display on the screen of terminal 2. If, however, the instruction is to be omitted, the logic queries at step 110 whether any nested instructions are present at step 110. If so, they are also omitted at step 112.

At decision block 114 the logic checks for more instructions. If there are more instructions, the logic iterates through the section beginning with step 104. If no more instructions remain, the platform specific panel display commands for the newly specified modified panel are stored in the library associated with the requesting application program.

If at step 102 it was discovered that the panel version requested by the application program already existed on the library of platform specific panel display commands, control passes to step 118 for retrieving them from the library. The display commands, already present or just stored at step 116, are then passed to the application program at step 120 and the run time component returns control at terminal 122.

There follows a pseudo code description of this aspect of my invention.

Application Program Pseudocode:
```
I    .
I
I    .
Issue subsystem call to create panel: PanelA
I and omit the 'Name' entry field from the panel
```

```
| name this version: PanelA_v1
|   .
|   .
|   .
Issue subsystem call to create panel: PanelA
| and omit the 'Zip' entry field from the panel
| name this version: PanelA_v2
|   .
|   .
|   .
```

Runtime-Versioning Pseudocode

```
GetPanel function:
| If this version name for this panel is not in the
|   library then do
| | Do for every instruction in panel:
| |   | if request did not say to omit this field
| | | | then do process the instruction
| | | end
| | | else do
| | | | discard the instruction
| | | | if instruction contains nested
| | | | | instructions then do
| | | | | discard all nested instructions as well
| | | | end
| | | end
| | end
| | Store created panel in library under version
| | name
| End
| Get this version of the panel from the library
| Pass the panel back to the requesting application
Return
```

It should be noted that my invention automatically reflows text and graphic elements of a panel display upon any run time implemented changes therein. This feature is especially advantageous when an element is omitted and no excess white space appears upon display.

Figure 9:
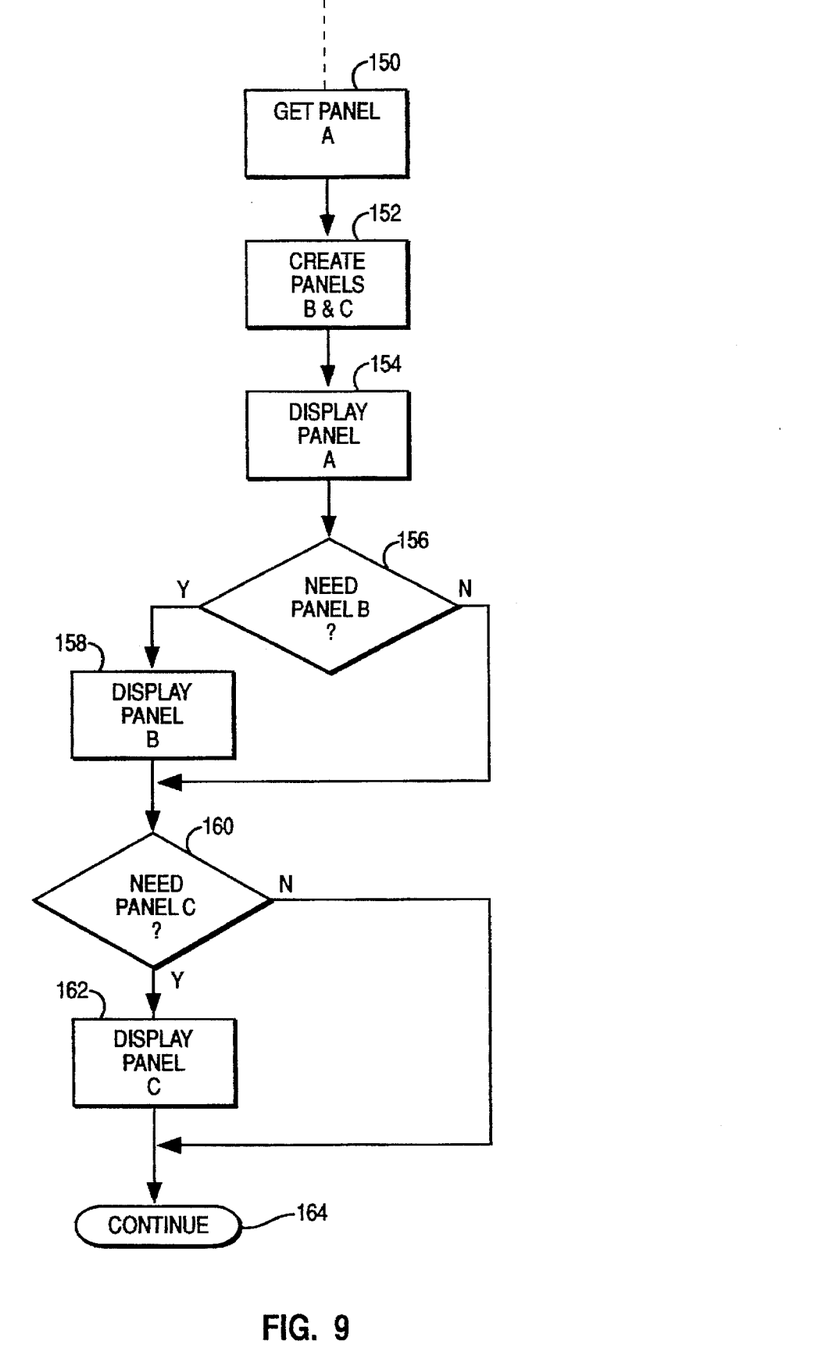
FIG. 9 is an example of application program use of look ahead panel creation.

Still another key feature of my invention relates to look ahead panel creation which feature permits an application program to be perceived as requiring no panel generation delay time. FIG. 9 is an example of the use of this feature by an application program at run time. We pick up application program, 84 FIG. 7, at step 150 when it has issued the appropriate command to retrieve the set of platform specific display commands from library 86 for displaying interactive panel A to a user of application program 84. The application program developer of course knew that possible user responses to Panel A include choosing options requiring the display of interactive panels B or C. Thus, user choices may be anticipated and both panels can be readied. That action is caused at step 152 before Panel A is displayed to the user at step 154.

As the user is interacting with Panel A, the logic can determine at block 156 whether Panel B has been chosen. If so, Panel B is displayed at step 158 with no delay since it was created. If the user did not opt for Panel B, then the logic checks to see if Panel C was chosen. If so, Panel C is displayed at step 162. If not, the application program logic continues at step 164.

There follows a pseudo code description of the just described application program steps.
Application Pseudocode:

```
Issue subsystem call to get panel: (PanelA)
Determine possible subsequent panels that
    may be displayed based on user input on PanelA
    (possible options are PanelB & PanelC)
**Issue asynchronous subsystem call to create
    panels in background (PanelB; PanelC)
Issue subsystem call to display panel: (PanelA)
Get user input from PanelA
If user requests PanelB then do
| Issue subsystem call to get panel: (PanelB)
| Determine possible subsequent panels that may
|     be displayed based on user input on PanelB
|     (none)
| Issue subsystem call to display panel: (PanelB)
End
If user requests PanelC then do
| Issue subsystem call to get panel: (PanelC)
| Determine possible subsequent panels that
|     may be displayed based on user input on PanelC
|     (none)
| Issue subsystem call to display panel: (PanelC)
End
```

Figure 10:
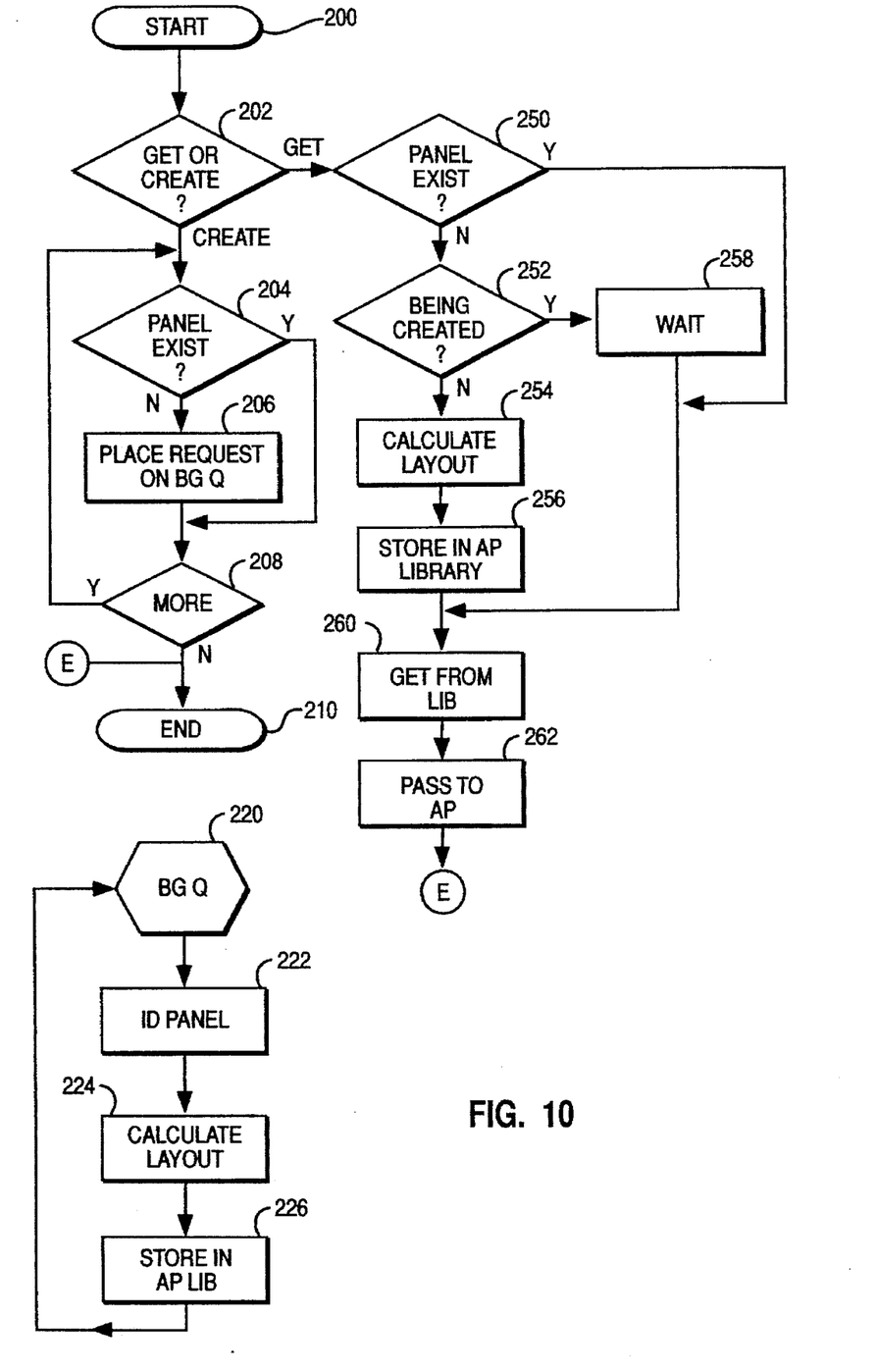
FIG. 10 is a flow chart of logic enabling look ahead panel creation.

FIG. 10 illustrates the logic followed by the run time component (80, FIG. 7) of my invention in servicing the application program logic of FIG. 9.

The logic performed by the run time component of the system of my invention in response to an application program's request for a panel or use of the look ahead panel create feature begins at terminal 200. Step 202 represents a determination of the nature of the application program's request as either a get or create. If at step 202 it was determined that the application program was using the look-ahead panel create feature of the present invention, the logic first checks at decision block 204 whether the requested panel already exists on the library associated with the application program. Not finding the panel on the library at step 206 the logic places a request on the queue of a background processor to generate the panel. If the requested panel does not already exist the logic is ready at step 208 to determine whether there are more application program panel requests. If so control is passed back to step 204. Otherwise processing ends at terminal 210.

The actions resulting from step 206 are indicated at process step 220 which represents a background process checking its queue for panel build requests. At step 222 the id of the panel being built is stored in memory for subsequent use as will be described below. Step 224 represents the construction of platform specific panel display commands for effecting display of the panel to the user of the application program. Once the panel display commands are generated they are stored on the library associated with the application program.

If the logic determines at step 202 that the application program has issued a GET, meaning that the specified panel is for immediate display, the logic checks whether the requested panel already exists on the panel display command library associated with the application program. Not finding the panel in the library, the logic then determines at decision block 252 whether it is already being created by the background process. This determination involves checking the memory for an id stored at step 222. If not, the logic constructs the platform specific panel display command set for effecting display of the panel to the user of the application program at step 254 and stores the result in the library at step 256.

If the requested panel was found to exist at step 250 control branches to step 260 for retrieving the panel display command set from the library. Similarly, if at step 252 it was found that the requested panel was already being created, the logic entered a wait state at step 258 until the background process completed creation before advancing to step 260. Once the requested panel is retrieved from the library, it is passed to the application program for display to its user at step 262.

It should be understood that the calculate layout steps 224 and 254 of FIG. 10 are preferably carried out in accordance with the teachings of my copending application Ser. No. 07/747,167.

It should also be clear that the run time versioning feature of the present invention described in connection with FIG. 8 above may also be used with the just described look ahead panel creation feature.

There follows a pseudo code description of the look ahead panel create feature of the run time component described in connection with FIG. 10.

```
CreatePanel:
| Do for all requested panels:
| | If requested panel not already created (and
| |   stored in library) then do
| | | place request on queue for background process
| | | to create the panel
| | End
| | Else do /* The panel has been previously
| | | create */
| | | discard request
| | End
| End
Return Do forever
| If request for a panel creation is on the queue
| | then do
| | Set id for current panel being created (used in | |
  'Get' processing)
| | Calculate the panel layout
| | Store created panel in the library
| end
end GetPanel:
| If requested panel is not in the library then do
| | If this panel is currently being created in
| | | background then do
| | | wait until the panel creation is completed
| | end
| | else do /* not currently being create */
| | | Calculate the panel layout
| | | Store created panel in the library
| | end
| end
| Get panel from the library
| Pass the panel back to the application
Return
```

While the invention has been described having reference to a particular preferred embodiment and modifications thereto, various changes in form and detail may be made without departing from the spirit and scope of the invention as claimed.

I claim:

1. A method of preparing interactive display panels for use in a graphical user interface to an application program comprising the steps of:

constructing at build time of the application program a data file containing display layout parameters for a plurality of related panels, said data file correlating each display layout parameter with a respective set of related panels, wherein at least one set of related panels differs from any other set of related panels;

generating from said data file a set of panel build instruction groups incorporated in the application program, each one of said panel build instruction groups containing the display layout parameters for a respective one of said plurality of related panels; and responsive to an application call, accessing during application program run time said set of panel build instruction groups for displaying application program designated ones of said related panels.

2. The method of claim 1 wherein said generating step includes:

structuring a member of said set of panel build instruction groups by looking at each said display layout parameter for determining whether it is identified with said member being structured.

3. The method of claim 2 wherein said accessing step includes for each member of said set of panel build instruction groups:

retrieving a copy of a panel build instruction group;

dynamically creating a platform specific panel display command set; and storing in a library associated with said application program each panel display command set used by said application program.

4. The method of claim 3 including the additional steps of:

specifying at run time a further one of said plurality of related panels;

structuring another platform specific panel build display command set, corresponding to said further one of said plurality of related panels; and storing said another platform specific panel build command set on said library.

5. The method as recited in claim 1 further comprising a step of preparing a new interactive panel at application program run time from a previously stored panel build instruction group, the preparing step comprising the steps of:

specifying new panel layout parameters as a function of previously stored panel layout parameters;

generating a panel display command set containing platform specific display characteristics: and dynamically developing a display in accordance with said panel build instruction group.

6. A system for preparing interactive display panels for use in a graphical user interface to an application program comprising:

means for constructing at build time a data file containing display layout parameters for a plurality of related panels, said data file correlating each display layout parameter with a respective set of related panels, wherein at least one set of related panels differs from any other set of related panels;

means for generating from said data file a set of panel build instruction groups incorporated in the application program, each one of said panel build instruction groups containing the display layout parameters for a respective one of said plurality of related panels; and means responsive to an application call for accessing during application program run time said set of panel build instruction groups for displaying application program designated ones of said related panels.

7. The system of claim 6 wherein said means for generating includes:

means for structuring a member of said set of panel build instruction groups by looking at each said display layout parameter for determining whether it is identified with said member being structured.

8. The system of claim 7 wherein said means for accessing includes;

means for retrieving a copy of a panel build instruction group;

means for dynamically creating a platform specific panel display command set; and means for storing in a library associated with said application program each panel display command set used by said application program.

9. The system of claim 8 further including:

means for specifying at run time a further one of said plurality of related panels;

means for creating another panel display command set corresponding to said further one of said plurality of related panels; and means for storing said another panel display command set in said library.

10. The system as recited in claim 6 further comprising means for enabling real time development and display of interactive display panels at application program run time, comprising:

means for making a modified version of a previously stored panel build instruction group, means for generating platform specific panel display commands corresponding to said modified version; and library means associated with said application program for storing said platform specific display commands.

11. An interactive panel display generation system for facilitating user interface to an application program comprising:

a build time component having means for specifying a data file containing layout parameters for a plurality of related panels, wherein at least one layout parameter is unique to one related panel and generating from the data file and storing panel build instruction groups in the application program, each panel build instruction group containing display layout parameters for one related panel of said application program; and a run time component for dynamically developing platform specific panel display commands from said stored panel build instruction groups.

12. The system of claim 11 wherein said run time component also includes:

means for storing panel display commands in a library associated with the application program.

13. The system of claim 12 wherein said run time component additionally includes:

means for creating a new panel through making modifications in a previously stored panel build instruction group; and means for dynamically developing and storing platform specific panel display commands from the run time modified panel build instruction group.

14. The system of claim 12 wherein said run time component includes:

means for retrieving panel display commands from a library associated with an application program;

means for immediately displaying a first panel in accord with retrieved panel display commands; and means for preparing a second panel for later display in accord with retrieved panel display commands as a function of user interaction with the first panel.

15. A computer program product for generating interactive panel displays for providing a graphical user interface to an application program comprising:

a computer usable medium on which is recorded computer readable program code including:

a build time component means for accepting and storing in a single source file panel build instructions for a plurality of related panel configurations, said single source file correlating each build instruction with a respective set of related panels, wherein at least one set of related panels differs from any other set of related panels generating from said data file a set of program panel build instruction groups, incorporated in the application program each one of said panel build instruction groups containing the display layout parameters for a respective one of said plurality of related panels; and a run time component means comprising;

means for dynamically preparing platform specific panel display commands from build time stored panel build instructions; and means for accepting modifications to build time stored panel build instructions and dynamically preparing platform specific panel display commands therefrom, and means responsive to an application call for accessing during application program run time said set of panel build instruction groups for displaying application program designated ones of said related panels.

16. The computer program product of claim 15 wherein said run time component means also includes:

means for immediately displaying in accordance with dynamically prepared platform specific panel display commands; and means for subsequently displaying in accordance with dynamically prepared commands as a function of user response to an earlier displayed panel.

* * * * *